(12) United States Patent
Chan et al.

(10) Patent No.: US 7,058,164 B1
(45) Date of Patent: Jun. 6, 2006

(54) EXTERNALLY INTERRUPTING A COMMUNICATION SESSION

(75) Inventors: Alex Yiu-Man Chan, Mountain View, CA (US); Wai-Yip Tung, San Francisco, CA (US); David C. Lee, Sunnyvale, CA (US); Stanley K. Poon, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 171 days.

(21) Appl. No.: 10/295,278

(22) Filed: Nov. 15, 2002

(51) Int. Cl.
*H04M 1/64* (2006.01)

(52) U.S. Cl. .............................. 379/88.17; 379/93.09; 379/265.09; 379/908

(58) Field of Classification Search ............ 704/270.1, 704/260; 709/227, 310; 379/265.09
See application file for complete search history.

(56) References Cited

U.S. PATENT DOCUMENTS

| | | | |
|---|---|---|---|
| 6,507,817 B1* | 1/2003 | Wolfe et al. ................ | 704/260 |
| 2002/0059073 A1* | 5/2002 | Zondervan et al. ....... | 704/270.1 |
| 2002/0194388 A1* | 12/2002 | Boloker et al. ............ | 709/310 |
| 2003/0053615 A1* | 3/2003 | Anderson et al. ....... | 379/265.09 |
| 2003/0108184 A1* | 6/2003 | Brown et al. .......... | 379/265.09 |

OTHER PUBLICATIONS

Raggett, Dave, "Getting started with VoiceXML 2.0", W3C, Revised Nov. 14, 2001, at http://www.w3.org/Voice/Guide, Nov. 14, 2001.
Cisco VoiceSML 1.0 Reference, Cisco IOS Release 12.2(2)XB, (last visted Nov. 1, 2002).
McGlashan, Scott, et al, "Voice Extensible Markup Language (VoiceXML) Version 2.0", W3C, Apr. 24, 2002, http://www.w3.org/TR/voicexml20/(posted Nov. 4, 2002).

* cited by examiner

*Primary Examiner*—Fan Tsang
*Assistant Examiner*—Lisa Hashem
(74) *Attorney, Agent, or Firm*—Baker Botts L.L.P.

(57) ABSTRACT

According to a particular embodiment of the present invention, a method for externally interrupting a telephony communication session includes establishing the telephony communication session with a remote user using a telephony interface. The method further includes loading a web page specifying one or more event handlers and media for presentation and presenting the media through a voice portion of the telephony communication session using the telephony interface. The method also includes handling input received by the telephony interface through the telephony communication session and receiving an interrupt at an interrupt handler, the interrupt specifying a session identifier for the telephony communication session. The method further includes identifying and communicating an event based on the interrupt and handling the event using a matching one of the event handlers of the web page.

36 Claims, 2 Drawing Sheets

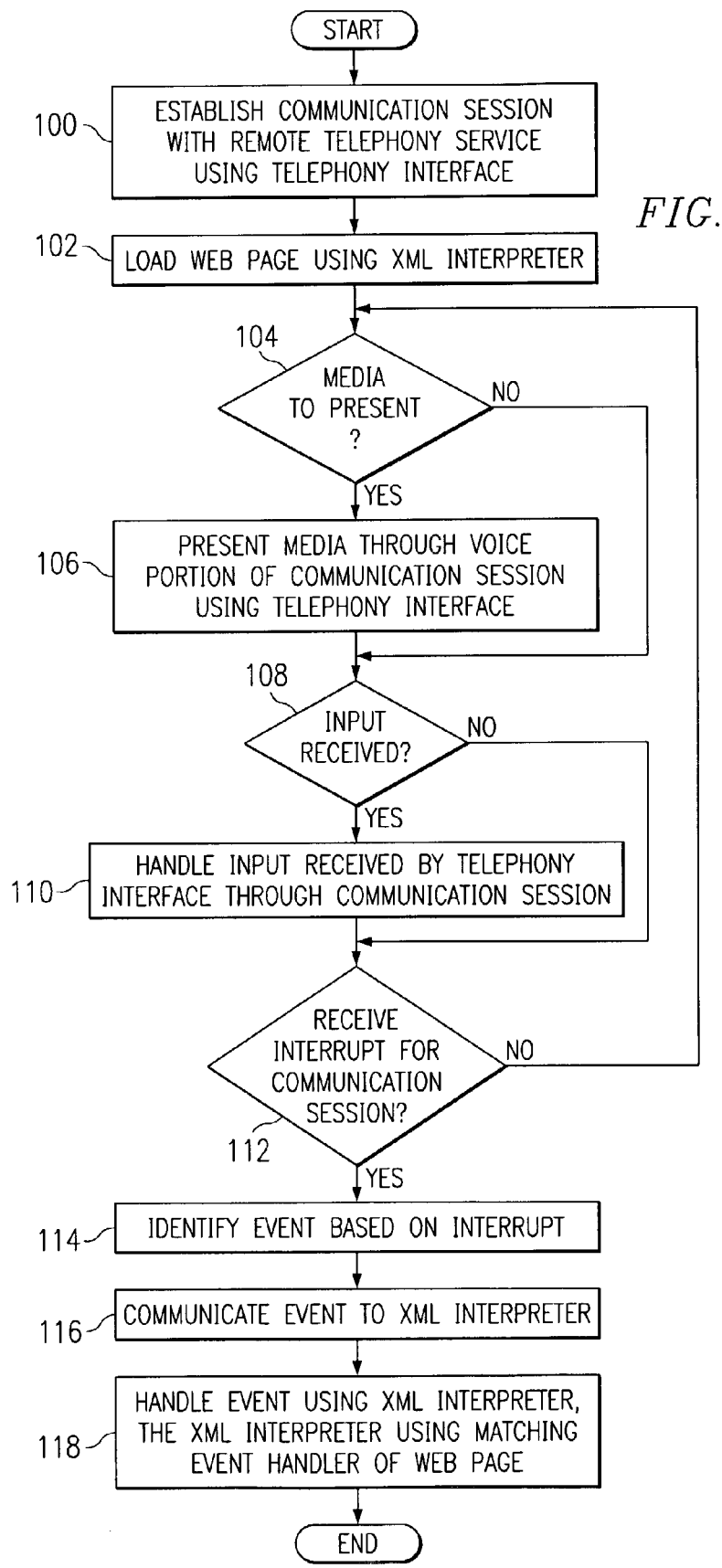

EXTERNALLY INTERRUPTING A COMMUNICATION SESSION

TECHNICAL FIELD OF THE INVENTION

This invention relates in general to communication sessions, and more particularly to externally interrupting a communication session.

BACKGROUND OF THE INVENTION

A communication session frequently includes providing a caller with interactive features. For example, in a call center environment, a caller may be able to select certain options using an interactive voice response (IVR) system such as by speaking or pressing buttons. Some systems implement the interactive features using voice extensible markup language (VoiceXML). VoiceXML interpreters typically accept input from a caller in either dual tone multi-frequency (DTMF) or single input (either voice or text) form.

SUMMARY OF THE INVENTION

In accordance with the present invention, techniques for externally interrupting a communication session are provided.

According to a particular embodiment of the present invention, a method for externally interrupting a telephony communication session includes establishing the telephony communication session with a remote user using a telephony interface. The method further includes loading a web page specifying one or more event handlers and media for presentation and presenting the media through a voice portion of the telephony communication session using the telephony interface. The method also includes handling input received by the telephony interface through the telephony communication session and receiving an interrupt at an interrupt handler, the interrupt specifying a session identifier for the telephony communication session. The method further includes identifying and communicating an event based on the interrupt and handling the event using a matching one of the event handlers of the web page.

Particular embodiments of the present invention may provide one or more technical advantages. For example, certain embodiments may, in addition to allowing a user associated with a communication session to interrupt the communication session, also allow a third party to interrupt the communication session. Certain embodiments may allow first-party multimodal access to the communication session. For example, a user may be able to simultaneously access a call center environment using a telephonic device and a web browser on an electronic device, making various selections in the communication session through either the communication session or a network connection associated with the electronic device. Furthermore, when processing an interrupt, the present invention may permit an XML interpreter to continue using the same web page, possibly preserving context and data.

Other technical advantages of the present invention will be readily apparent to one skilled in the art in the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIG. 2 illustrates an example table for mapping received interrupts to extensible markup language (XML) interpreters handling communication sessions;

FIG. 3 illustrates an example table for mapping received interrupts to events;

FIG. 5 illustrates an example method for externally interrupting a communication session.

DETAILED DESCRIPTION OF THE DRAWINGS

Figure 1:
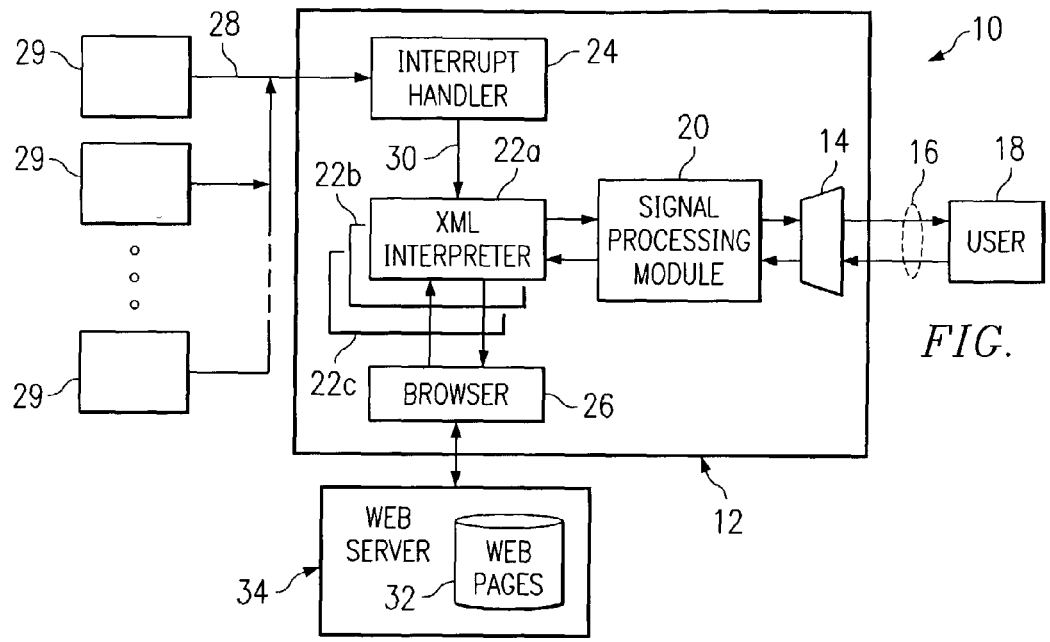
FIG. 1 illustrates an example communication system operable to externally interrupt a communication session.

FIG. 1 illustrates an example communication system 10 operable to externally interrupt a communication session. Communication system 10 includes an application server 12 associated with a remote telephony service, application server 12 including a telephony interface 14 operable to establish a communication session 16 between a user 18 and application server 12. In the embodiment illustrated, application server 12 also includes a signal processing module 20, an extensible markup language (XML) interpreter 22, an interrupt handler 24, and a browser 26. In general, interrupt handler 24 provides certain features for allowing an interrupt 28 to "externally" interrupt communication session 16.

Telephony interface 14 is operable to establish communication sessions 16 between users 18 and application server 12. For example, telephony interface 14 may establish communication session 16 between user 18 and signal processing module 20. Communication session 16 may enable transmission and receipt of voice, data, or other suitable information between two or more endpoints, for example. Signal processing module 20 may include dualtone multi-frequency (DTMF) signal interpretation, automatic speech recognition (ASR) services, and other suitable services for interacting with user 18 during communication session 16. In one embodiment, the remote telephony system associate with application server 12 is a call center environment, user 18 is a caller to the call center environment, and communication session 16 is a voice communication session. In another embodiment, user 18 is a caller to the call center environment, and communication session 16 is a data communication session, such as a computer network connection.

Interrupt handler 24 enables application server 12 to process interrupts received outside of communication sessions 16. Interrupt handler 24 is operable to receive interrupt 28, identify an event 30 based on interrupt 28, and communicate event 30 to an appropriate XML interpreter 22. Interrupt 28 may originate from a variety of sources and may include a web request, a voice command, a series of key presses, or any other suitable type of interrupt. As an example, in a call center environment, voice communication session 16 may be established between user 18 and application server 12. It may be desirable for one or more third parties 29 (i.e. a person or system other than user 18) to "externally" interrupt communication session 16 using interrupt 28. Third party 29 may be a computer system, an agent associated with the call center, or any other suitable third party. For example, a call center may wish to terminate calls after a predetermined time period. A clock associated with the call center may time communication session 16 and once the predetermined time has elapsed, interrupt communication session 16, possibly to terminate it. In another embodiment, user 18 may interrupt its communication session 16 with application server 12 using another connection, such as a computer network connection, to interrupt handler 24 (This type of operation is described in greater detail with respect to FIG. 4 below).

Interrupt 28 represents any suitable message or process for externally signaling an event to an active communication session 16. For example, interrupt 28 may be a packet, a second communication session 16, a web connection, or other appropriate signaling mechanism. Interrupt 28 may include a session identifier identifying the communication session 16 to interrupt. In certain embodiments, interrupt 28 may include multiple session identifiers identifying multiple communication sessions 16 to interrupt. Interrupt 28 may also include associated payload data that may be used in processing interrupt 28. The payload data may include any information necessary for interrupt handler 24 to identify event 30 based on interrupt 28.

Interrupt handler 24 may include a web server, interactive voice response (IVR) system, or other suitable interface for receiving interrupts 28. According to particular embodiments, interrupt handler 24 receives interrupts 28 at an internet protocol (IP) address. Interrupt handler 24 may use a particular protocol and a particular data format for receiving interrupts 28. For example, the protocol for interrupt handler 24 may include hyper text transfer protocol (HTTP), skinny gateway protocol (SKINNY), session initiated protocol (SIP), or any other suitable protocol according to particular needs. The data format for interrupt handler 24 may include XML, plain text, binary, or any other suitable data format.

In one embodiment, application server 12 includes multiple instances of XML interpreter 22, each instance of XML interpreter 22 corresponding to a particular communication session 16. Each instance of XML interpreter 22 may interpret XML or other suitable files to control interaction between application server 12 and the user 18 associated with the communication session 16 associated with the instance of XML interpreter 22. For example, XML interpreter 22 may provide and interpret a form for capturing information from user 18. An XML file may include an event handler for processing events from users 18 and/or external interrupts 28. In certain embodiments, a designer of the XML file may select the events that an XML file or web page will handle.

After receiving an interrupt 28, interrupt handler 24 identifies event 30 based on the received interrupt 28. Interrupt handler 24 may also determine the XML interpreter 22 associated with interrupt 28. In one embodiment, interrupt handler 24 accesses one or more tables or other database formats to identify event 30 and the associated XML interpreter 22. FIG. 2 illustrates an example session mapping table 50 for mapping received interrupts 28 to XML interpreters 22 handling communication sessions 16. Session mapping table 50 may contain a list of session identifiers 52 in column 54 and a list of associated XML interpreters 22 in column 56. Session mapping table 50 matches session identifiers 52 associated with a particular communication session 16 and included in each interrupt 28 to an XML interpreter 22 associated with the particular communication session 16. FIG. 3 illustrates an event mapping table 60 for identifying events 30 based on received interrupts 28. Table 60 contains a list of interrupts 28 in column 64 and a list of associated events 30 in column 66. Table 60 matches interrupts 28 to their associated events 30. Interrupt handler 24 may access table 60 to identify the event 30 associated with a particular interrupt 28 received by interrupt handler 24. Although tables 50 and 60 are described as tables, one skilled in the art will appreciate that any suitable database format operable to be accessed and map associated data may be used.

Returning to FIG. 1, interrupt handler 24 may communicate a defined event 30 to XML interpreter 22 for handling. Events 30 may include a text string and one or more variables. The text string may describe the purpose of the interrupt 28 associated with the event 30. For example, an event 30 may be defined as "TERMINATE, 0" for execution by the TERMINATE event handler (of a web page) with a variable input of 0 indicating zero seconds until communication session 16 should terminate. Event 30 may be caused based on an interrupt providing any suitable information according to particular needs. Those skilled in the art will appreciate that inclusion of the one or more variables is not necessary but may provide flexibility within the event handler.

XML interpreter 22 may process XML files or web pages to control interaction with users 18 and processing of communication sessions 16. In one embodiment, application server 12 may have an instance of XML interpreter 22 for each communication session 16 established with users 18. For example, XML interpreter 22a, XML interpreter 22b, and XML interpreter 22c may each be associated with a different communication session 16. In one embodiment, XML interpreter 22 may include voice XML (VoiceXML) capabilities. XML interpreter 22 is operable to load a web page 32 that specifies one or more event handlers and media for presentation. In certain embodiments, browser 26 may retrieve XML files or web pages 32 requested by XML interpreter 22. Web server 34 may store and serve up the XML files or web pages 32 in response to requests from XML interpreter 22. In an embodiment where XML interpreter 22 includes VoiceXML capabilities, XML interpreter 22 may interpret web page 32 using VoiceXML standards. For example, XML interpreter 22 may interpret web pages 32 using the WORLD WIDE WEB CONSORTIUM (W3C) VoiceXML 2.0 standards, without modification to those standards. Web server 34 may be local or remote to application server 12. After loading web page 32, XML interpreter 22 executes commands in web page 32 and handles input using event handlers in web page 32. For example, XML interpreter 22 may receive an event signaled by user 18 within communication session 16. Alternatively or in addition, XML interpreter 22 may receive an event 30 from interrupt handler 24 and handle event 30 using a matching one of the event handlers of web page 32. This enables XML interpreter 22 to handle an external event without requiring a new web page 32 to be loaded or generated. However, the event handler can link to a new web page 32 in response to an event.

While system 10 is illustrated as including particular elements in a specific configuration, the functionalities of these elements may be combined, separated, and/or rearranged as appropriate. Moreover, the operations of some or all of these elements may be implemented by logic encoded in media.

Application server 12, signal processing module 20, XML interpreter 22, interrupt handler 24, browser 26, and web server 34 may each comprise an appropriate combination of hardware and software associated with one or more computers at one or more locations. These components of system 10 may share data storage, communications, or other resources according to particular needs. For example, functionality described in connection with application server 12, signal processing module 20, XML interpreter 22, interrupt handler 24, browser 26, and web server 34 may be provided using a single computer system, which in a particular embodiment might include a single server system. Furthermore, functionality described in connection with application server 12, signal processing module 20, XML interpreter 22, interrupt handler 24, browser 26, and web server 34 may be provided using any suitable software components. Each computer system may include one or more suitable input devices, output devices, mass storage media, processors, memory, or other components for receiving, processing, storing, and communicating information according to the operation of system 10. In a distributed embodiment of system 10, particular components of system 10 may be communicatively coupled to one another using one or more local area networks (LANs), metropolitan area networks (MANs), wide area networks (WANs), a global computer network such as the Internet, or any other wireline, optical, wireless, or other links.

In operation of system 10, telephony interface 14 establishes communication session 16 between user 18 and application server 12 associated with a remote telephony service. During establishment of communication session 16, application server 12 generates an instance of XML interpreter 22 for handling interaction with user 18 and processing of communication session 16. XML interpreter 22 may load web page 32, which may specify one or more event handlers and media for presentation to user 18. XML interpreter 22 may determine whether media for presentation to user 18 exists. If so, XML interpreter 22 may present the media through a voice portion of communication session 16 using telephony interface 14. Otherwise, XML interpreter 22 determines if input is received by telephony interface 14 through communication session 16. If so, XML interpreter 22 handles the input received by telephony interface 14 through communication session 16. Otherwise, interrupt handler 24 determines if it has received interrupt 28 for this XML interpreter 22/communication session 16. For example, interrupt handler 24 can determine the appropriate XML interpreter 22 to receive an event by accessing session mapping table 50 using a session identifier 52 in interrupt 28. Upon receiving interrupt 28 for communication session 16, interrupt handler 24 identifies event 30 based on interrupt 28 and communicates event 30 to XML interpreter 22. XML interpreter 22 may handle event 30 using a matching event handler of web page 32. Handling event 30 may include linking to a new web page 32, presenting media to user 18 via communication session 16, performing call processing functions on communication session 16, or performing other appropriate operations. Moreover, if user 18 is connected to application server using a second connection, such as through a web browser, this may include communicating information using the second connection.

Figure 4:
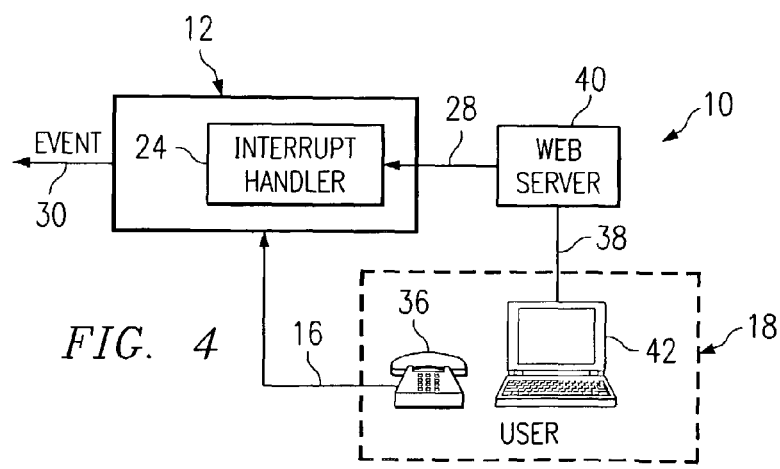
FIG. 4 illustrates an example first-party multimodal embodiment of a portion of the communication system.

FIG. 4 illustrates an example first-party multimodal embodiment of a portion of system 10. Using a telephonic device 36, user 18 engages in communication session 16 with application server 12 associated with a remote telephony service. User 18 may desire to interrupt communication session 16 in some manner other than through speech or key presses using telephonic device 36. Therefore, user 18 establishes a network connection 38 with a web server 40 using a computing device 42. Using computing device 42, user 18 indicates an interrupt 28 via network connection 38 to web server 40. For example, user 18 may select an option on a web page presented by web server 40. In response, web server 40 then transmits interrupt 28 to interrupt handler 24 on application server 12. Interrupt handler 24 may then identify event 30 associated with interrupt 28, and may then interrupt communication session 16 between user 18 and application server 12. This may allow user 18 to be engaged in a communication session 16 and simultaneously interrupt communication session 16 using another connection to interrupt handler 24. User 18 may establish the multimodal access with application server 12 using the same or different elements, such as telephony device 36 and computing device 42. Furthermore, although the second mode of access is described as a computing device 42 connecting to web server 40, those skilled in the art will appreciate that any suitable method of connecting to application server 12 and generating interrupts 28 may be used.

Particular embodiments of the present invention may provide one or more technical advantages. For example, certain embodiments may, in addition to allowing user 18 associated with communication session 16 to interrupt communication session 16, also allow a third party to interrupt communication session 16. Certain embodiments may allow first-party multimodal access to communication session 16. For example, a user may be able to simultaneously access a call center environment using a telephonic device 36 and a web browser on an computing device 42, making various selections in communication session 16 through either communication session 16 or a network connection 38 associated with computing device 42. Furthermore, when processing interrupt 28, the present invention may permit XML interpreter 22 to continue using the same web page 32, possibly preserving context and data.

FIG. 5 illustrates an example method for externally interrupting communication session 16. At step 100, telephony interface 14 establishes communication session 16 between user 18 and application server 12 associated with a remote telephony service. In one embodiment, remote telephony service comprises a call center environment. During establishment of communication session 16, application server 12 generates an instance of XML interpreter 22 for handling interaction with user 18 and processing of communication session 16. At step 102, XML interpreter 22 loads web page 32. Web page 32 may specify one or more event handlers and media for presentation to user 18. For example, web page 32 may specify audio files or other suitable information for presentation to user 18. At step 104, XML interpreter 22 determines whether media for presentation to user 18 exists. If so, XML interpreter 22 presents the media through a voice portion of communication session 16 using telephony interface 14 at step 106. Otherwise, the method advances to step 108, where XML interpreter 22 determines if input is received by telephony interface 14 through communication session 16. If so, XML interpreter 22 handles the input received by telephony interface 14 through communication session 16 at step 110. Otherwise, the method advances to step 112.

At step 112, interrupt handler 24 determines if it has received interrupt 28 for this XML interpreter 22/communication session 16. For example, interrupt handler 24 can determine the appropriate XML interpreter 22 to receive an event by accessing session mapping table 50 using a session identifier 52 in interrupt 28. As previously discussed, interrupt 28 may originate from a variety of sources and may include a web request, a voice command, a series of key presses, a packet, or any other suitable type of interrupt. Upon receiving interrupt 28 for communication session 16, interrupt handler 24 identifies event 30 based on interrupt 28 at step 114. Interrupt handler 24 then communicates event 30 to XML interpreter 22 at step 116. At step 118, XML interpreter 22 handles event 30 using a matching event handler of web page 32. Handling event 30 may include linking to a new web page 32, presenting media to user 18 via communication session 16, performing call processing functions on communication session 16, or performing other appropriate operations. Moreover, if user 18 is connected to application server 12 using a second connection, such as through a web browser, this may include communicating information using the second connection. While decision steps 104, 108, and 112 are described as sequential, those skilled in the art will understand that in certain embodiments, these steps may be occurring substantially simultaneously or in different orders than shown during the execution method. Moreover, application server 12 may use methods with additional steps, fewer steps, and/or different steps, so long as the methods remain appropriate, and the steps of the methods may be repeated according to particular needs.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A communication system, comprising:
   a telephony interface operable to establish a telephony communication session with a remote user;
   an extensible markup language (XML) interpreter operable to load a web page that specifies one or more event handlers and media for presentation, the XML interpreter further operable to present the media through a voice portion of the telephony communication session using the telephony interface and to handle input received by the telephony interface through the telephony communication session;
   an interrupt handler operable to:
      receive an interrupt external to the telephony communication session, the interrupt specifying a session identifier for the telephony communication session;
      identify an event based on the interrupt; and
      communicate the event to the XML interpreter; and
   the XML interpreter further operable to handle the event using a matching one of the event handlers of the web page.

2. The system of claim 1, wherein the event comprises a text string and one or more variables, the XML interpreter being operable to determine the matching event handler using the text string.

3. The system of claim 1, wherein the interrupt handler comprises a web server operable to receive an interrupt communicated from a web browser.

4. The system of claim 1, wherein the interrupt handler is further operable to access a table to identify the event based on the interrupt, the table comprising multiple interrupt entries and multiple event entries and matching each interrupt entry to one or more corresponding event entries.

5. The system of claim 4, wherein the interrupt comprises payload data matching to an entry in the table, the entry mapping to the one or more events associated with the interrupt.

6. The system of claim 1, further comprising a plurality of XML interpreters, each XML interpreter being associated with a separate telephony communication session established with the telephony interface, the interrupt handler routing the event to the appropriate XML interpreter.

7. The system of claim 6, wherein the interrupt handler is further operable to access a session mapping table to determine the XML interpreter associated with the interrupt comprising the session identifier for the telephony communication session, the session mapping table comprising multiple session identifier entries and multiple XML interpreter entries and matching each session identifier entry to its corresponding XML interpreter.

8. The system of claim 1, wherein the XML interpreter comprises a voice XML (VoiceXML) interpreter.

9. The system of claim 8, wherein the VoiceXML interpreter is operable to interpret the web page using VoiceXML standards.

10. The system of claim 1, wherein the user comprises the telephony device and a computing device, the telephony device handling the telephony communication session and the computing device generating the interrupt and communicating the interrupt external to the telephony communication session.

11. The system of claim 1, further comprising a plurality of agents for handling calls.

12. The system of claim 11, wherein the system receives the interrupt from an agent signaling an availability to handle the telephony communication session and in response, the XML interpreter transfers the telephony communication session to the agent.

13. A method for externally interrupting a telephony communication session, comprising:
   establishing the telephony communication session with a remote user using a telephony interface;
   loading a web page specifying one or more event handlers and media for presentation;
   presenting the media through a voice portion of the telephony communication session using the telephony interface;
   handling input received by the telephony interface through the telephony communication session;
   receiving an interrupt at an interrupt handler, the interrupt being external to the telephony communication session and specifying a session identifier for the telephony communication session;
   identifying and communicating an event based on the interrupt; and
   handling the event using a matching one of the event handlers of the web page.

14. The method of claim 13, further comprising determining the matching event handler using a text string, the event comprising a text string and one or more variables.

15. The method of claim 13, wherein the interrupt handler comprises a web server operable to receive an interrupt communicated from a web browser.

16. The method of claim 13, wherein identifying the event based on the interrupt comprises the interrupt handler accessing a table, the table comprising multiple interrupt entries and multiple event entries and matching each interrupt entry to one or more corresponding event entries.

17. The method of claim 16, wherein the interrupt comprises payload data matching to an entry in the table, the entry mapping to the one or more events associated with the interrupt.

18. The method of claim 13, further comprising establishing a plurality of telephony communication sessions, each telephony communication session having an associated XML interpreter, the interrupt handler routing the event to the appropriate XML interpreter.

19. The method of claim 18, wherein determining the XML interpreter associated with the interrupt comprising the session identifier for the telephony communication session comprises the interrupt handler accessing a session mapping table, the session mapping table comprising multiple session identifier entries and multiple XML interpreter entries and matching each session identifier entry to its corresponding XML interpreter.

20. The method of claim 18, wherein the XML interpreter comprises a voice XML (VoiceXML) interpreter.

21. The method of claim 20, wherein the XML interpreter is operable to interpret the web page using VoiceXML standards.

22. The method of claim 13, wherein the user comprises a telephony device and a computing device, the telephony device handling the telephony communication session and the computing device generating the interrupt and communicating the interrupt external to the telephony communication session.

23. The method of claim 13, wherein the interrupt handler receives the interrupt from an agent signaling an availability to handle the telephony communication session and in response, the XML interpreter transfers the telephony communication session to the agent.

24. Software for externally interrupting a telephony communication session, the software being embodied in computer-readable media and when executed operable to:
    establish the telephony communication session with a remote user using a telephony interface;
    load a web page specifying one or more event handlers and media for presentation;
    present the media through a voice portion of the telephony communication session using the telephony interface;
    handle input received by the telephony interface through the telephony communication session;
    receive an interrupt at an interrupt handler, the interrupt being external to the telephony communication session and specifying a session identifier for the telephony communication session;
    identify and communicate an event based on the interrupt; and
    handle the event using a matching one of the event handlers of the web page.

25. The software of claim 24, further operable to determine the matching event handler using a text string, the event comprising a text string and one or more variables.

26. The software of claim 24, wherein the interrupt handler comprises a web server operable to receive an interrupt communicated from a web browser.

27. The software of claim 24, is further operable access a table to identify the event based on the interrupt, the table comprising multiple interrupt entries and multiple event entries and matching each interrupt entry to one or more corresponding event entries.

28. The software of claim 27, wherein the interrupt comprises payload data matching to an entry in the table, the entry mapping to the one or more events associated with the interrupt.

29. The software of claim 24, further operable to establish a plurality of telephony communication sessions, each telephony communication session having an associated XML interpreter, the interrupt handler routing the event to the appropriate XML interpreter.

30. The software of claim 29, further operable to access a session mapping table to determine the XML interpreter associated with the interrupt comprising the session identifier for the telephony communication session, the session mapping table comprising multiple session identifier entries and multiple XML interpreter entries and matching each session identifier entry to its corresponding XML interpreter.

31. The software of claim 29, wherein the XML interpreter comprises a voice XML (VoiceXML) interpreter.

32. The software of claim 31, wherein the VoiceXML interpreter is operable to interpret the web page using Voice XML standards.

33. The software of claim 24, wherein the user comprises a telephony device and a computing device, the telephony device handling the telephony communication session and the computing device generating the interrupt and communicating the interrupt external to the telephony communication session.

34. The software of claim 24, wherein the interrupt handler receives the interrupt from an agent signaling an availability to handle the telephony communication session and in response, the XML interpreter transfers the telephony communication session to the agent.

35. A system for externally interrupting a telephony communication session, comprising:
    means for establishing the telephony communication session with a remote user using a telephony interface;
    means for loading a web page using an extensible markup language (XML) interpreter, the web page specifying one or more event handlers and media for presentation;
    the XML interpreter presenting the media through a voice portion of the telephony communication session using the telephony interface and handling input received by the telephony interface through the telephony communication session;
    means for receiving an interrupt external to the telephony communication session, the interrupt at an interrupt handler, the interrupt specifying a session identifier for the telephony communication session, the interrupt handler identifying an event based on the interrupt and communicating the event to the XML interpreter; and
    means for handling the event using the XML interpreter, the XML interpreter using a matching one of the event handlers of the web page.

36. A call center environment operable to externally interrupt a plurality of telephony communication sessions, comprising:
    a telephony interface operable to establish the telephony communication sessions with a plurality of remote users associated with the call center environment;
    a plurality of voice extensible markup language (VoiceXML) interpreters each associated with a particular telephony communication session, each VoiceXML interpreter operable to load a web page that specifies one or more event handlers and media for presentation, each VoiceXML interpreter further operable to present the media through a voice portion of the telephony communication session using the telephony interface and to handle input received by the telephony interface through the telephony communication session;
    an interrupt handler operable to:
        receive an interrupt external to the telephony communication session, the interrupt specifying a session identifier for the telephony communication session;
        access a first table to determine the VoiceXML interpreter associated with the interrupt comprising the session identifier for the telephony communication session, the first table comprising multiple session identifier entries and multiple VoiceXML interpreter entries and matching each session identifier entry to its corresponding VoiceXML interpreter;

access a second table to identify an event based on the interrupt, the second table comprising multiple interrupt entries and multiple event entries and matching each interrupt entry to one or more corresponding event entries; and communicate the event to the VoiceXML interpreter, the event comprising a text string and one or more variables; and the VoiceXML interpreter further operable to handle the event using a matching one of the event handlers of the web page, the VoiceXML interpreter being operable to determine the matching event handler using the text string.

* * * * *